(12) United States Patent
Weber et al.

(10) Patent No.: US 8,535,193 B2
(45) Date of Patent: Sep. 17, 2013

(54) LOWER POWERTRAIN AXLE SHROUD

(75) Inventors: Jason J. Weber, Peoria, IL (US); John B. Salomon, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 287 days.

(21) Appl. No.: 13/048,960

(22) Filed: Mar. 16, 2011

(65) Prior Publication Data

US 2012/0238396 A1  Sep. 20, 2012

(51) Int. Cl.
*F16H 48/06* (2006.01)

(52) U.S. Cl.
USPC ........................................................ 475/230

(58) Field of Classification Search
USPC .................................................. 475/160, 230
See application file for complete search history.

(56) References Cited

U.S. PATENT DOCUMENTS

| | | | |
|---|---|---|---|
| 2,492,267 A | 12/1949 | Burrows et al. | |
| 2,510,996 A | * 6/1950 | Morgan | 475/246 |
| 3,741,343 A | 6/1973 | Lindenfeld et al. | |
| 5,404,964 A | 4/1995 | Zinsmeyer et al. | |
| 5,505,112 A | 4/1996 | Gee | |
| 5,584,773 A | 12/1996 | Kershaw et al. | |
| 5,709,135 A | 1/1998 | Baxter | |
| 5,718,651 A | 2/1998 | Merkle et al. | |
| 6,969,336 B1 | 11/2005 | Korner et al. | |
| 7,703,352 B2 | 4/2010 | Legner et al. | |
| 2005/0085331 A1* | 4/2005 | Prucher | 475/230 |
| 2010/0009800 A1 | 1/2010 | Altvaten et al. | |

* cited by examiner

*Primary Examiner* — Edwin A Young
(74) *Attorney, Agent, or Firm* — Miller, Matthias & Hull

(57) ABSTRACT

A shroud assembly and method for assembling such shroud assembly for a vehicle are disclosed. The shroud may comprise a collar joined to a nose cap. The shroud assembly may comprise the collar, the nose cap, and meshed ring and pinion gears. The collar may define at least one port and the nose cap may define an aperture. These allow lubricating fluid to escape outside of the shroud and thus be removed from the immediate vicinity of the rotating ring and pinion gears.

18 Claims, 7 Drawing Sheets

LOWER POWERTRAIN AXLE SHROUD

TECHNICAL FIELD

The present disclosure generally relates to shrouds disposed in axle housings of vehicles and, more particularly, relates to shrouds configured to cover ring and pinion gear sets in axle housings used in earth moving, construction, material handling, mining applications, and the like.

BACKGROUND

The axle housings of vehicles used for earth moving, construction, material handling, mining, and the like, are partially filled with oil or other lubricating fluid (collectively, "oil") to facilitate contact between meshing gears contained in the housing. It is desirable to have a film of oil between meshing gear teeth in order to avoid the extreme heat that may otherwise be created in the contact area of the teeth. Such extreme heat causes, between the surfaces of the meshing gear teeth, micro-welding that results in tearing and pitting of the gear teeth and breaking of the teeth due to material fatigue.

Each axle housing typically contains a toothed gear set such as a ring gear and a pinion gear. The teeth of the smaller dimensioned pinion gear mesh with the teeth of the ring gear. Generally, an output shaft from the vehicle transmission provides power to rotate the pinion gear. The rotating and meshing of the pinion gear teeth with the ring gear teeth drives the ring gear and transfers power, through the rotating ring gear, to the wheels of the vehicle. The gear ratio of the pinion gear to the ring gear typically creates a reduction of the input speed from the transmission and an increase in the torque applied to the wheels.

Generally, the axle housing is filled with enough oil to ensure that all gear teeth, including those of the ring and pinion gears, are lubricated. Thus, a larger gear disposed generally vertically within the axle housing (such as the ring gear), which requires a lower fill level of oil in the axle housing, has to rotate through a much deeper oil fill level in order to ensure that other gears (for example, those with smaller diameters, those positioned horizontally) are adequately lubricated. Thus, the oil flow around a large gear, such as the ring gear, is often turbulent due to the depth of oil in which the gear must rotate. This turbulence may be compounded by the meshing of gears, such as the ring and pinion gears, that have different rotational axes. The input power required to overcome the resistance of the oil to the rotation of the gear(s) may be referred to as "churning loss." This churning loss results in increased fuel usage as more input power must be applied to make-up for the churning loss.

U.S. Publication No. 2010/0009800 ("Altvaten et al.") published Jan. 14, 2010 is an example of prior art related to oil flow associated with ring gears in axle drives. FIG. 1 of Altvaten et al. illustrates the flow of oil in an axle drive provided by rotation of a ring gear. According to Altvaten et al., movement of the oil by the ring gear creates turbulence that sprays the oil over the differential cage and reduces the useful quantity of oil delivered for circulation by the ring gear. FIG. 2 of Altvaten et al. illustrates an annular disk positioned between the ring gear and the differential cage. The disk forms a seal against the differential cover and provides a barrier that redirects the sprayed oil back to the ring gear. While this design may maximize the volume of oil recirculated around the ring gear, it disadvantageously increases churning loss because an increase in the volume of oil around the ring gear creates more turbulence and drag on the ring gear.

U.S. Pat. No. 5,505,112 issued Apr. 9, 1996 (the '112 Patent) incorporates a semi-circle half shield in a countershaft assembly having multiple gears of various diameters disposed along a common axis. As shown in FIGS. 2-3 of the '112 Patent, the shield isolates the gear with the largest radius in a separate reservoir from the other smaller gears positioned along a common axis of rotation. This type of half shield has drawbacks and may not be effective when utilized with meshing gears having different axes of rotation, particularly meshing ring and pinion gear sets where the pinion may rotate around an axis of rotation that is generally perpendicular to the axis of rotation for the ring gear. A better design is needed that decreases churning loss.

SUMMARY OF THE DISCLOSURE

In accordance with one aspect of the disclosure, a shroud is disclosed that covers a gear assembly that includes a ring gear meshed with a pinion gear. The shroud may comprise a collar configured to generally surround the ring gear and a nose cap attached to the collar. The nose cap may be configured to at least partially surround the pinion gear. The collar may have a first open port therethrough and the nose cap may have an aperture therethrough.

In accordance with another aspect of the disclosure, a shroud assembly configured to be affixed inside of an axle housing is disclosed for a vehicle having an axle housing. The shroud assembly may comprise a ring gear having a plurality of teeth, a pinion gear having a plurality of teeth, a shroud collar including a floor and a first collar side, and a nose cap extending from the first collar side and at least partially covering the pinion gear. The nose cap may include a sidewall defining an aperture proximal to the upper half of the pinion gear. The floor may define an open first port and the collar may generally surround the ring gear. At least one of the pinion gear teeth may be meshed with at least one of the ring gear teeth.

In accordance with a further aspect of the disclosure, a method of assembling a shroud assembly for a vehicle is disclosed. The method may comprise providing an axle housing and a shroud. The shroud may include a collar and a nose cap attached to the collar, and the nose cap may include a sidewall having a top portion that defines an aperture. The collar may include a floor that defines first and second ports disposed in an upper half of the collar. The method further includes providing a ring gear having a plurality of ring gear teeth and a pinion gear having a plurality of pinion gear teeth, positioning the shroud inside the axle housing; and positioning a ring gear and a pinion gear inside the shroud with the ring gear and pinion gear teeth meshed and the aperture aligned above the meshed ring gear and pinion gear teeth.

DETAILED DESCRIPTION

Figure 1:
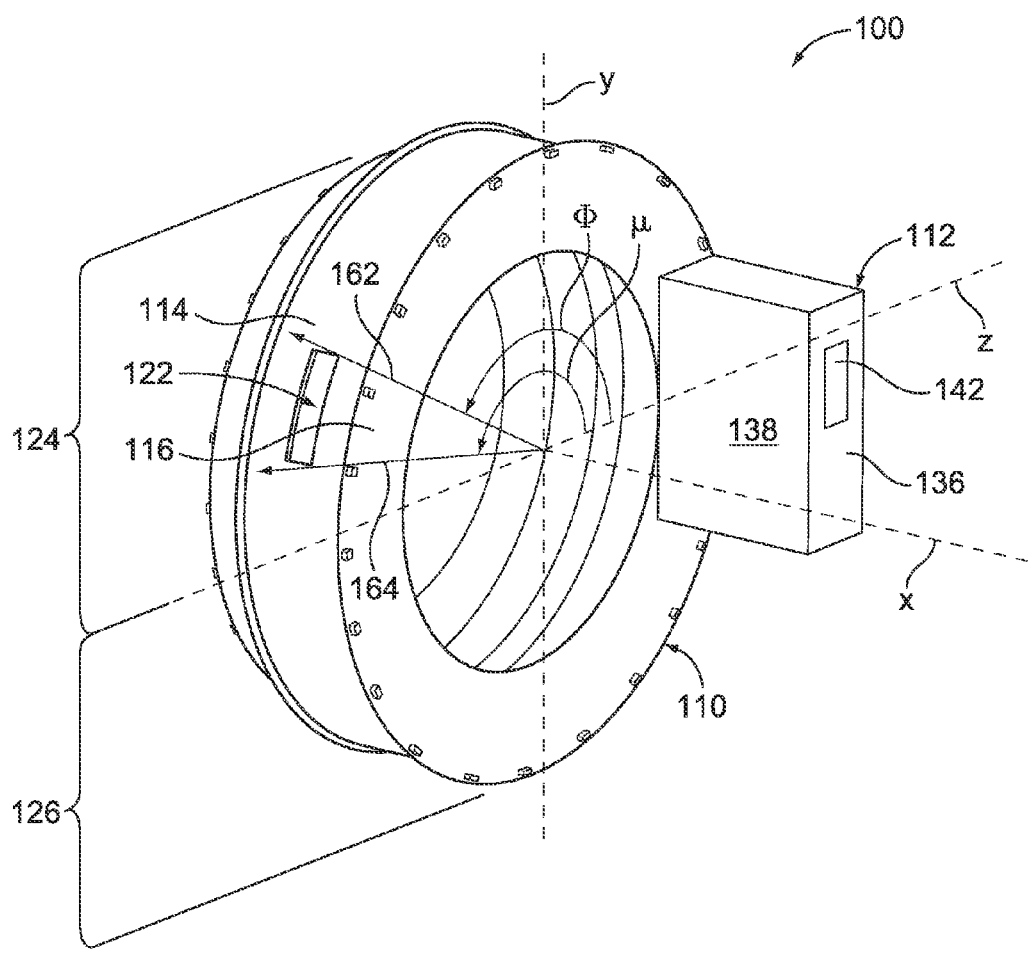
FIG. 1 is a perspective view of an exemplary shroud constructed in accordance with the teachings of this disclosure.
Figure 2:
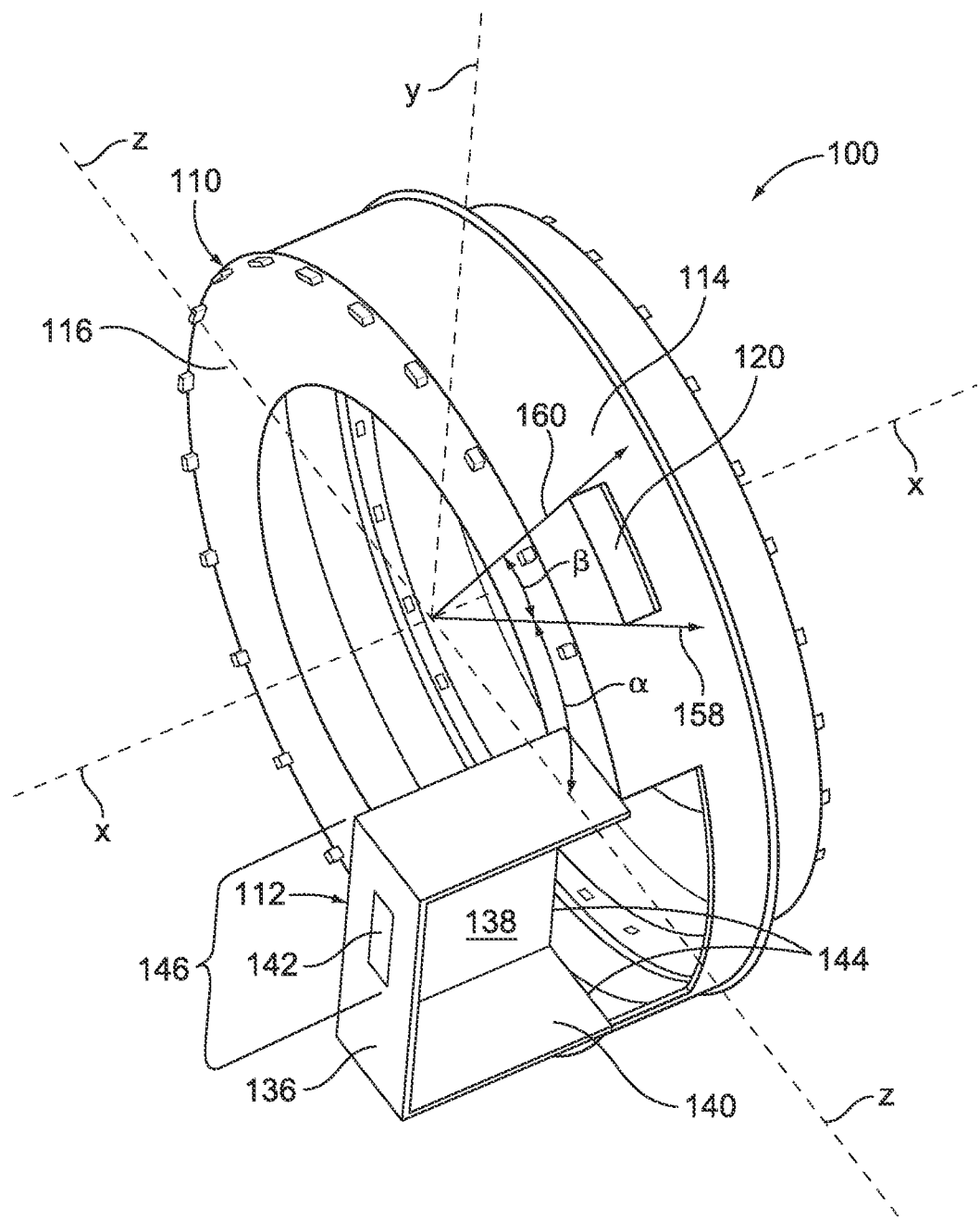
FIG. 2 is another perspective view of the exemplary shroud of FIG. 1.
Figure 3:
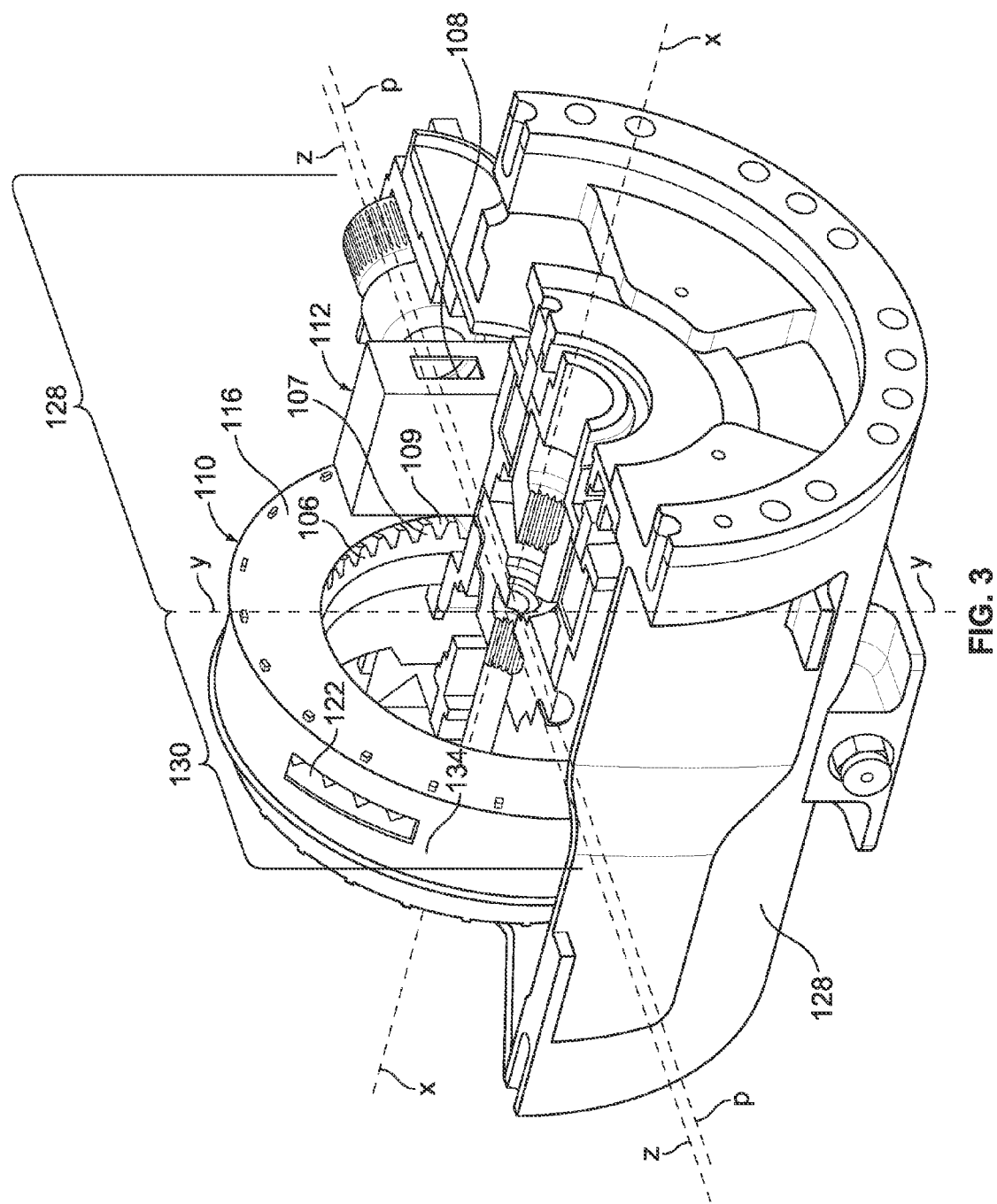
FIG. 3 is a cut-away view of an exemplary axle housing containing the shroud of FIG. 1 surrounding a ring gear and pinion gear.
Figure 4:
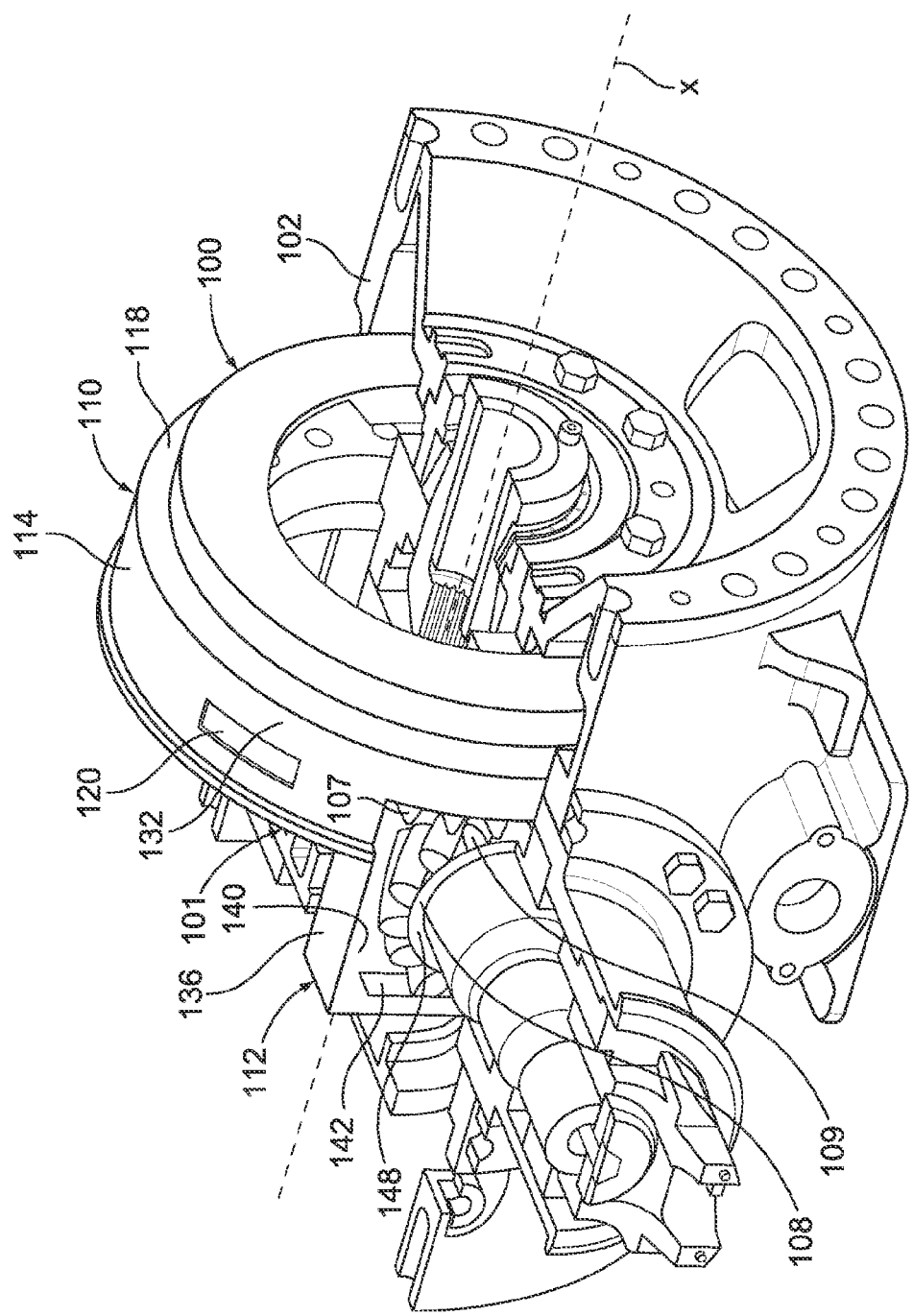
FIG. 4 is another cut-away view of the exemplary axle housing of FIG. 3.

Referring now to the drawings, and with specific reference to FIGS. 1-2, there is shown a shroud constructed in accordance with the present disclosure and generally referred to by reference numeral 100. FIGS. 3-4 illustrate cut-away views of an exemplary axle housing 102 in which the exemplary shroud 100 of FIGS. 1-2 is disposed. In FIGS. 3-4, the shroud 100 covers a ring gear 106 having a plurality of ring gear teeth 107 and a pinion gear 108 having a plurality of pinion gear teeth 109. Herein, for the purposes of illustrating the teachings of the disclosure, a shroud assembly 101 may be referred to and may comprise the shroud 100, the ring gear 106 and the pinion gear 108. While the following detailed description and drawings are made with reference to a shroud 100 in an axle housing 102 of a wheel loader, the teachings of this disclosure may be employed on other earth moving, construction, material handling or mining vehicles in which gear assemblies are disposed inside axle housings partially filled with oil or other lubricating fluid.

Figure 5:
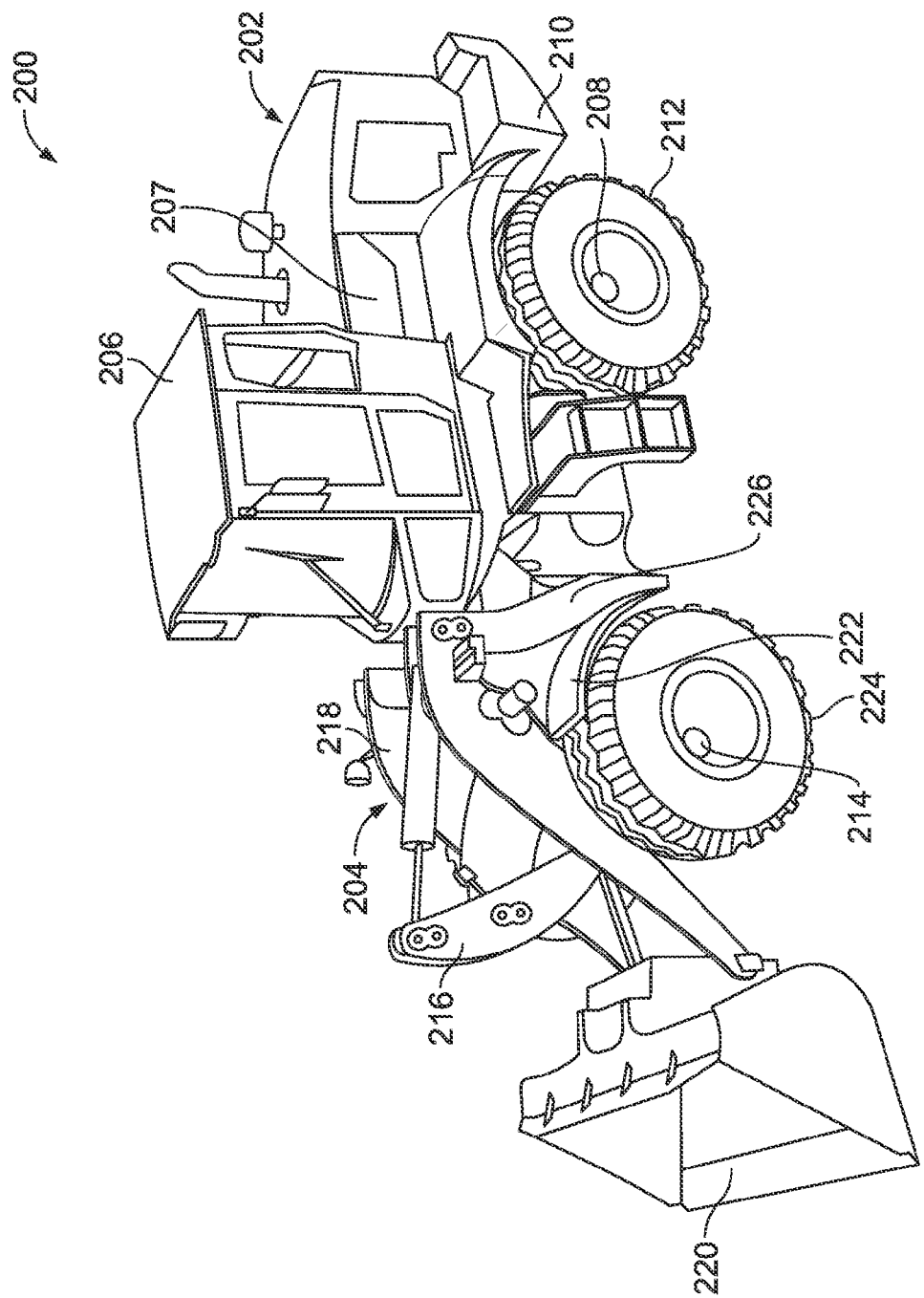
FIG. 5 is perspective view of a machine that incorporates the features of the present disclosure.

FIG. 5 illustrates one example of a machine 200 that incorporates the features of the present disclosure. The machine 200 includes a rear portion 202 and a front portion 204. The rear portion 202 may include a cab assembly 206, an engine 207, a rear axle housing assembly 208 including a shroud covering a ring gear and pinion gear (not shown), and drive train components (not shown) mounted to a rear frame 210. Rear wheels 212 may be mounted to the rear axle housing assembly 208. The front portion 204 may include a frame assembly 226 and a front axle housing assembly 214 including a shroud covering a ring gear and pinion gear (not shown). A boom assembly 216 and a lift arm assembly 218 may be mounted on the frame assembly 226. An implement 220 may be attached to the boom assembly 216 and to the lift arm assembly 218. The frame assembly 226 may be mounted on a fender 222. The fender 222 and front wheels 224 may be mounted on the front axle housing assembly 214.

Turning now to FIGS. 1-4, the shroud 100 may comprise a collar 110 and a nose cap 112 extending from and affixed to the collar 110. The nose cap 112 may be welded or fixedly secured to the collar 110 or, alternatively, may be integral to a portion of the collar 110 as part of the same casting. The collar 110 may include a floor 114 and a first collar wall 116. In some embodiments, the collar may include first and second spaced apart collar walls 116, 118 separated by the floor 114. The second collar wall 118 may, in some embodiments, be stepped in shape. In the exemplary embodiment illustrated in FIGS. 1-4, the collar 110 is generally cylindrical or annular in shape and generally surrounds the ring gear 106. In some embodiments, the ring gear 106 may be beveled. In other embodiments, the collar 110 may be other shapes, including but not limited to rectangular, square, oval and the like. As may be seen in FIGS. 3-4 the ring gear 106 is centered on and rotates around a ring gear axis X. In some embodiments, the collar 110 may also be centered on the ring gear axis X.

The collar 110 may define a first port 120 therethrough. In some embodiments, the first port 120 may be open and may be disposed in the floor 114 of the collar 110. The collar 110 may further define a second port 122 therethrough. Similar to the first port 120, the second port 122 may be open and may be disposed in the floor 114 of the collar 110. The shape of the first and second ports 120, 122 may be rectangular, circular, square or any other appropriate geometry. In other embodiments, the collar 110 may define more than two ports.

The collar has an upper half 124 and a lower half 126. Both the first and second ports 120, 122 may be disposed in upper half 124 of the collar 110. The upper half 124 of the collar 110 may be thought of as comprising two quadrants, a first quadrant 128 proximal to the nose cap 112 and a second quadrant 130 distal to the nose cap 112. Each quadrant is on either side of a vertical axis Y intersecting the ring gear axis X, and above a horizontal axis Z intersecting the ring gear axis. The horizontal axis Z may be disposed in the same horizontal plane as the pinion axis P around which the pinion gear 108 rotates.

The first port 120 may be disposed in the first quadrant 128 of the collar 110. The second port 122 may be disposed in the second quadrant 130 of the collar 110. In an embodiment, the first port 120 may be disposed in a first section 132 of the floor 114 disposed in the first quadrant 128. Similarly, the second port 122 may be disposed, at least partially, in a second section 134 of the floor 114 in the second quadrant 130 of the collar 110.

In one embodiment, the first section 132 may extend between a first radius 158 disposed at an angle $\alpha$ and a second radius 160 disposed at an angle $\beta$, wherein $\alpha$ is about 15° from the horizontal axis Z and $\beta$ is about 45° from the horizontal axis Z. For example, in an embodiment where the floor is an annular cylinder, the first section 132 may be an arc (on the circumference) between the first radius 158 disposed at about 15° (from the horizontal axis Z) and the second radius 160 disposed at about 45° (from the horizontal axis Z). In another embodiment, $\alpha$ may be about 25° from the horizontal axis Z and $\beta$ may be about 35° from the horizontal axis Z, thus the first section 132 may extend between about 25° from the horizontal axis Z to about 35° from the horizontal axis Z. In yet another alternative embodiment, in which the floor 114 is generally cylindrical-shaped and substantially centered around the ring gear axis X, at least a portion of the first port 120 may be disposed on the floor 114 at about the two o'clock position, or about 30° from the horizontal axis Z that is perpendicular to the ring gear axis X.

As discussed above, the second port 122 may be disposed in a second section 134 of the floor 114 in the second quadrant 130 of the collar 110. In one embodiment, the second section 134 extends, in the second quadrant, between a third radius 162 disposed at an angle $\theta$ and a second radius 164 disposed at an angle $\mu$, wherein angle $\theta$ is about 135° from the horizontal axis Z and angle $\mu$, is about 165° from the horizontal axis Z. For example, in an embodiment where the floor is an annular cylinder, the second section 134 may be an arc (on the circumference) between the third radius at about 135° (from the horizontal axis Z) and the fourth radius at about 165° (from the horizontal axis Z). In another embodiment, $\theta$ may be about 145° from the horizontal axis Z and $\mu$ may be about 155° from the horizontal axis Z, thus the second section 134 may extend between about 145° from the horizontal axis Z to about 155° from the horizontal axis Z. In yet another alternative embodiment, in which the floor is generally cylindrical-shaped and substantially centered around the ring gear axis X, at least a portion of the second port 122 may be disposed on the floor 114 at about the ten o'clock position, or about 150° from the horizontal axis Z that is perpendicular to the ring gear axis X.

The nose cap 112 may include a sidewall 136 and a backing 138. While in the exemplary embodiment illustrated in FIGS. 1-2, the sidewall 136 is rectangular in shape, other geometries are possible. For example, the sidewall 136 may be generally cylindrical (best seen in FIG. 6), the circumference of which may form a partial or complete circle. As illustrated in FIGS. 2 and 4, the nose cap 112 may at least partially define a cavity 140 into which a pinion gear 108 may be received. In some embodiments, such as that illustrated in FIGS. 2 and 4, both the nose cap 112 and the collar 110 may define the cavity 140. The sidewall 136 defines a mouth 144 that allows the pinion gear 108 to be disposed within the nose cap 112 such that the pinion gear 108 meshes with the ring gear 106. As best seen in FIG. 4, at least one of the pinion gear teeth 109 meshes with at least one of the ring gear teeth 107 when the pinion gear 108 is disposed in the cavity 140 and the ring gear 106 is disposed within the collar 110.

The nose cap 112 may define an aperture 142 therethrough. The aperture 142 may be disposed in the sidewall 136, preferably in the top portion 146 of the nose cap sidewall 136 and proximal to the upper half 148 of the pinion gear 108. In one embodiment, the aperture 142 may be disposed in the sidewall 136 proximal to the collar 110 and above the meshing of the ring gear teeth 107 with the pinion gear teeth 109. The shape of the aperture 142 may be rectangular, circular, square or any other appropriate geometry. In other embodiments, the nose cap 112 may define more than one aperture 142.

In some embodiments, the nose cap 112 may further include a flap 150 extending at least partially over the aperture 142 on an outside surface 152 of the nose cap 112. In some embodiments, the flap 150 may be fixed in position. The flap may be rigid or flexible. In other embodiments, the flap 150 may at least partially cover the aperture 142 and may be moveable between an open and a closed position. In some embodiments, the flap 150 may pivot between the open and closed position.

Figure 6:
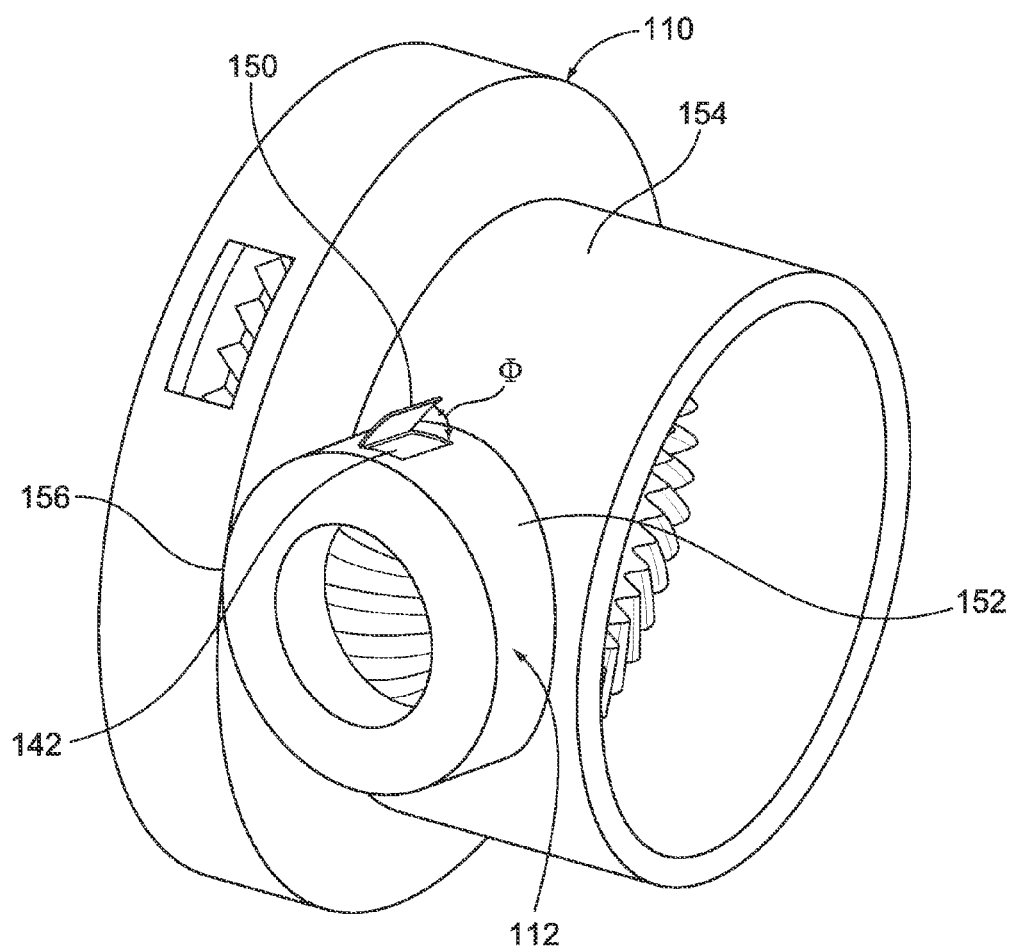
FIG. 6 is a perspective view of an alternative embodiment of the shroud.

FIG. 6 illustrates another embodiment of the shroud 100. The embodiment in FIG. 6 is somewhat similar to that shown in FIGS. 1-4. The shroud of FIG. 6 includes the addition of an optional channel portion 154 and illustrates an example of the optional flap 150 discussed above. The channel portion 154 may extend from the collar 110 and may shield other gears from oil in the axle housing 102. The nose cap 112 may be affixed to the collar 110 and the channel portion 154. The embodiment in FIG. 6 also illustrates a nose cap 112 with a generally semi-circular sidewall, as opposed to the more box-like embodiments shown in FIGS. 1-4. In FIG. 6 the semi-circular sidewall 136 forms a partial circle that is completed by a semi-circular inset 156 in the collar 110. However, while the shape of the collar 110, nose cap 112 and channel portion 154 are generally cylindrical (or semicircular in the case of the sidewall of the nose cap) in FIG. 6, these elements are not limited to this shape. The collar 110, nose cap 112 and channel portion 154 may be any appropriate shape, including but not limited to circular, semicircular, rectangular, square, oval, irregular, or the like.

Figure 7:
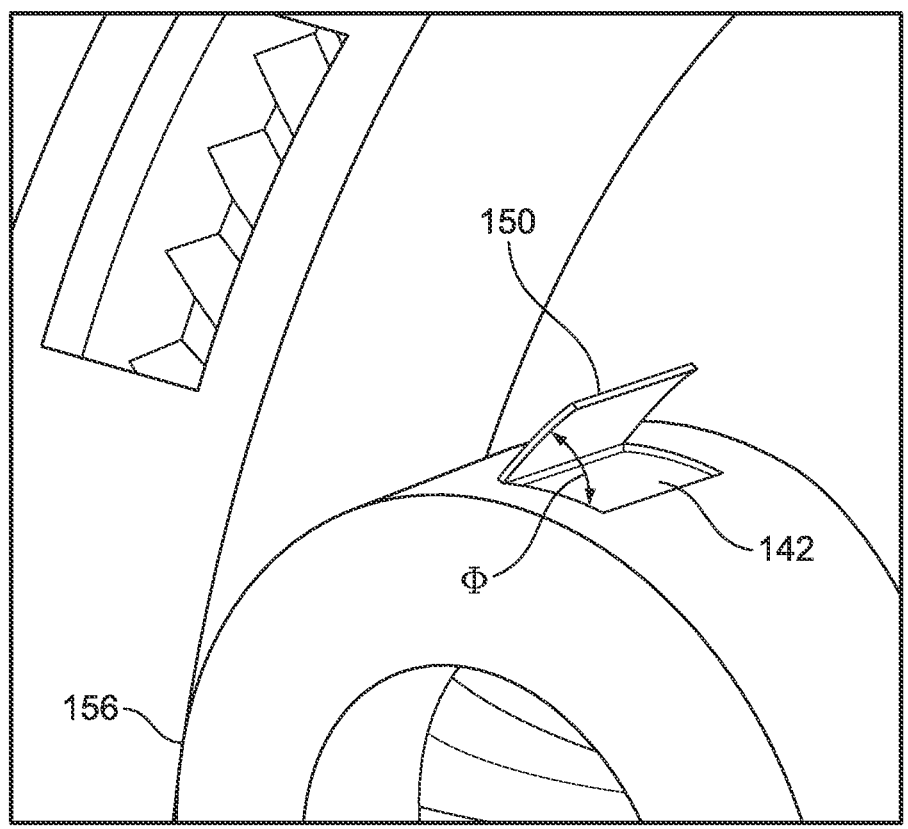
FIG. 7 is an enlarged detailed view of the flap of the shroud of FIG. 6.

FIG. 7 is an enlarged view of the flap 150 mounted on the nose cap 112. The flap 150 may extend at least partially over the aperture 142 to guide escaping oil in a direction away from the collar 110. The flap 150 may form an angle φ with a top surface of the nose cap 112. In one embodiment, φ may be in the range of about 80° to about 15°. In another embodiment, φ may be in the range of about 60° to about 25°. In a preferred embodiment, φ may be about 45°, plus or minus 10% deviation.

A method of assembling a shroud assembly 101 for a vehicle 200 is also disclosed. The method may comprise providing an axle housing 102 and a shroud 100. The shroud 100 may include a collar 110 and a nose cap 112 attached to the collar 100, and the nose cap 112 may include a sidewall 136 having a top portion 146 that defines an aperture 142. The collar 110 may include a floor 114 that defines first and second ports 120, 122 disposed in an upper half 124 of the collar 110. The method further includes providing a ring gear having a plurality of ring gear teeth and a pinion gear having a plurality of pinion gear teeth, positioning the shroud inside the axle housing; and positioning a ring gear and a pinion gear inside the shroud with the ring gear and pinion gear teeth meshed and the aperture aligned above the meshed ring gear and pinion gear teeth.

INDUSTRIAL APPLICABILITY

The axle housing contains an amount of oil that provides lubrication for the various moving parts within the axle housing, including the ring and pinion gears. The present disclosure may find applicability in reducing the amount of oil in the proximity of the rotating ring and pinion gears.

The rotation of the ring gear and pinion gear creates turbulence in the oil which increases the force necessary to overcome the resistance provided by the oil, creating churning losses. The shroud shields the ring gear and pinion gear from excess oil. The ports in the collar of the shroud allow oil thrown off by the rotating ring gear to escape from the shroud, thus reducing the amount of oil in the immediate proximity to ring gear.

Similarly, the aperture in the sidewall of the nose cap, provides an opening through which the oil thrown off by the rotating pinion gear may escape. When the aperture in the sidewall of the nose cap is disposed over the meshing of the ring gear and pinion gear teeth, oil thrown off by the meshing action of the ring and pinion gear teeth may escape through the aperture. The flap directs the flow of this oil away from the collar surrounding the ring gear, thus, making it less likely that the oil will return to the ring gear vicinity quickly. The shroud disclosed herein provides about a 30-50% reduction in churning loss.

The features disclosed herein may be particularly beneficial to wheel loaders and other earth moving, construction, mining or material handling vehicles that utilize gear sets within oil filled axle housings.

What is claimed is:

1. A shroud covering a ring gear meshed with a pinion gear, the shroud comprising:
   a collar configured to generally surround the ring gear, the collar including an open first port therethrough and a floor; and
   a nose cap including an aperture therethrough, the nose cap attached to the collar and configured to at least partially surround the pinion gear, wherein the first port is disposed in an upper half of the collar and a first section of the floor.

2. The shroud of claim 1, wherein the first section extends between about 15° to about 45° from a horizontal axis.

3. The shroud of claim 1, wherein the first section extends between about 25° to about 35° from a horizontal axis.

4. The shroud of claim 1, wherein the floor is generally cylindrical shaped and substantially centered around a ring gear axis, and at least a portion of the first port is disposed on the floor about 30° from a horizontal axis perpendicular to the ring gear axis.

5. The shroud of claim 1, in which the collar further includes an open second port therethrough.

6. The shroud of claim 5, wherein the first port is disposed in a first quadrant of the collar and the second port is disposed in a second quadrant of the collar.

7. The shroud of claim 6, wherein the second port is disposed in a second section of the floor.

8. The shroud of claim 7, wherein the first section extends between about 15° to about 45° from a horizontal axis and the second section extends between about 135° to about 165° from the horizontal axis.

9. The shroud of claim 7, wherein the floor is generally cylindrical-shaped and substantially centered around a ring gear axis, and at least a portion of the first port is disposed on the floor about 30° from a horizontal axis substantially perpendicular to the ring gear axis, and at least a portion of the second port is disposed on the floor about 150° from the horizontal axis.

10. The shroud of claim 1, in which the nose cap further includes a flap substantially covering the aperture, the flap moveable between an open and a closed position.

11. The shroud of claim 10, in which the nose cap further includes a sidewall having a top portion, wherein the aperture is disposed in the top portion of the sidewall and proximal to the collar.

12. A shroud assembly configured to be affixed inside of an axle housing, the shroud assembly comprising:
   a ring gear having a plurality of teeth;
   a pinion gear having a plurality of teeth, at least one of the pinion gear teeth meshed with at least one of the ring gear teeth;
   a collar including a floor and a first collar side, the floor defining an open first port, the collar generally surrounding the ring gear; and
   a nose cap extending from the first collar side and at least partially covering the pinion gear, the nose cap including a sidewall defining an aperture, the aperture proximal to the upper half of the pinion gear.

13. The shroud assembly of claim 12, wherein the aperture is above the meshed pinion gear and ring gear teeth.

14. The shroud assembly of claim 12, wherein the ring gear is rotatable about a ring gear axis and the pinion gear is rotatable about a pinion axis oriented generally perpendicularly to the ring gear axis.

15. The shroud assembly of claim 12, wherein the first port is disposed at least partially in a first section of the floor that extends between about 15° to about 45° from a horizontal axis.

16. The shroud assembly of claim 15, wherein the floor defines an open second port disposed in a second section of the floor that extends between about 135° to about 165° from the horizontal axis.

17. The shroud assembly of claim 12, in which the nose cap further includes a flap substantially covering the aperture, the flap pivotable between an open and a closed position, wherein the aperture is proximal to the meshed pinion gear and ring gear teeth.

18. A method of assembling a shroud assembly in an axle housing for a vehicle, the method comprising:
   providing an axle housing and a shroud, the shroud including a collar and a nose cap attached to the collar, the nose cap including a sidewall having a top portion that defines an aperture, the collar including a floor that defines first and second ports disposed in an upper half of the collar;
   providing a ring gear having a plurality of ring gear teeth and a pinion gear having a plurality of pinion gear teeth;
   positioning the shroud inside the axle housing; and
   positioning the ring gear and the pinion gear inside the shroud with the ring gear and pinion gear teeth meshed and the aperture aligned above the meshed ring gear and pinion gear teeth.

* * * * *